April 11, 1944.        R. C. STICKNEY        2,346,403
HOLDER FOR TOOTH PASTE TUBES
Filed Feb. 14, 1941
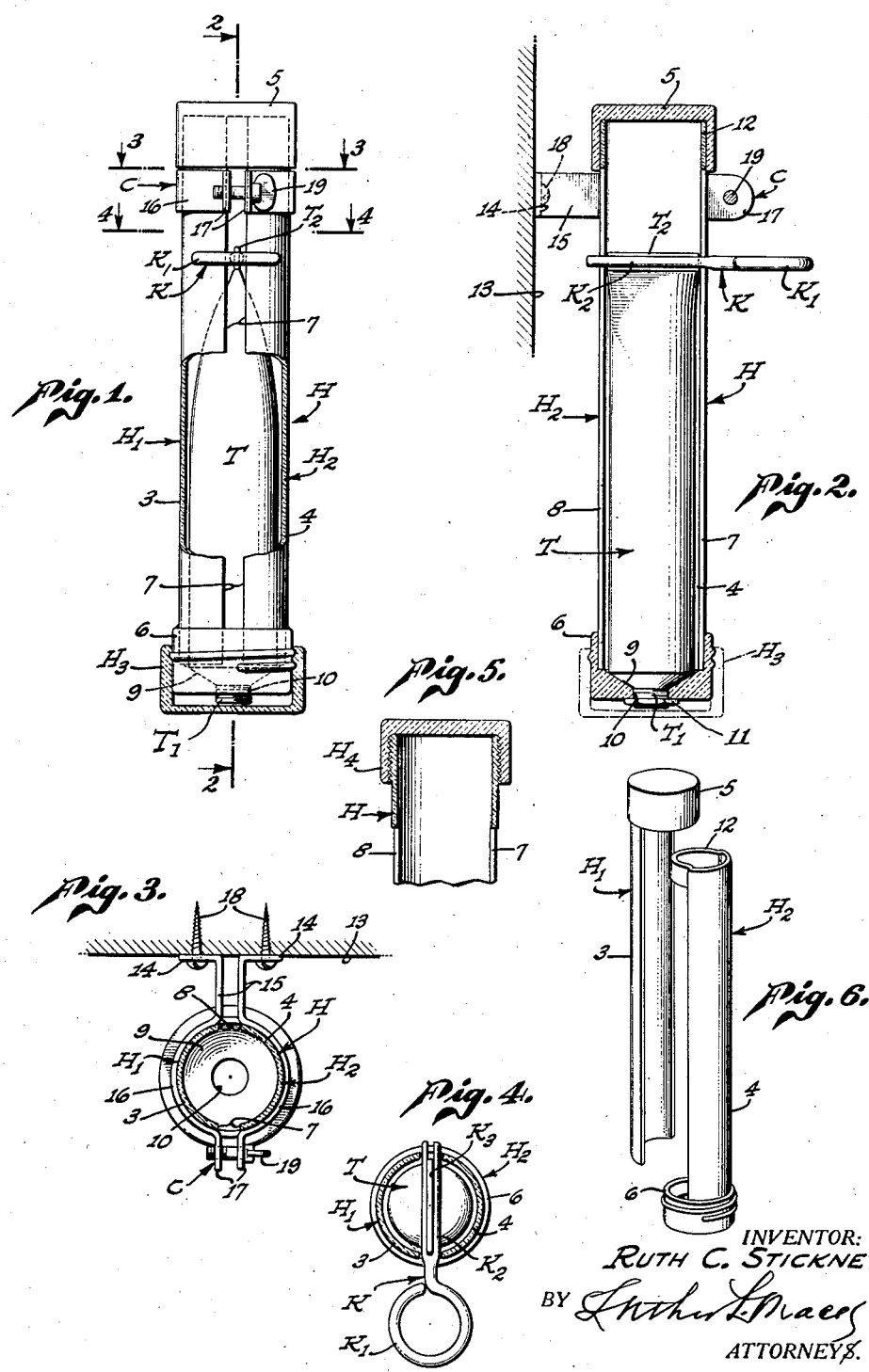
INVENTOR:
RUTH C. STICKNEY,
BY
ATTORNEYS.

Patented Apr. 11, 1944

2,346,403

UNITED STATES PATENT OFFICE 2,346,403

HOLDER FOR TOOTH PASTE TUBES

Ruth C. Stickney, Los Angeles, Calif.

Application February 14, 1941, Serial No. 378,922

1 Claim. (Cl. 221—60)

This invention relates to and has for an object the provision of a means for supporting and dispensing tube contained materials such as tooth paste, shaving cream and the like and includes a simple and economical holder into which a collapsible tube of material may be readily inserted and held in such a manner that the material may be easily dispensed from the tube through the instrumentality of a key or other device applicable to the bottom of the tube and having a gripping portion extended outwardly of the holder so that by rotating the key, the tube will be collapsed or rolled upon itself from the bottom to the head for forcing the material from the tube for use.

My invention comprehends the provision of a holder of tubular cross section with separable parts so that a tube of material to be dispensed may be easily inserted therein and removed therefrom and provided with one or more longitudinal slots in the body thereof, whereby a key may be inserted and applied to the usually flat bottom of the tube so that when the key is manually turned, the flexible metallic tube may be rolled on the stem of the key, thereby forcing the material from the tube.

An object, also, is to provide means for supporting the holder on a suitable surfaces.

Other objects are: to provide means for fixedly supporting a tube of material in position for dispensing the material therefrom, and means whereby when the usual sealing cap of a tube is removed, the orifice of the tube may be sealed against the atmosphere so as to preserve the contents of the tube.

Other objects may appear as the description of my device progresses.

I have shown a preferred form of device with minor modifications in the accompanying drawing, subject to further modification, within the scope of the appended claim, without departing from the spirit of my invention.

In said drawing:

Fig. 1 is a front elevation, partly in section;

Fig. 2 is a sectional elevation on line 2—2 of Fig. 1;

Fig. 3 is a sectional plan on line 3—3 of Fig. 1;

Fig. 4 is a sectional plan on line 4—4 of Fig. 1;

Fig. 5 is a fragmentary section on an axial line of Fig. 2 corresponding to line 2—2 of Fig. 1, showing a slightly modified form of device; and Fig. 6 is a perspective view of the form of device shown in Figs. 1 and 2, with the parts thereof separated.

Referring to Figs. 1 and 2, in the form shown, the device includes a holder H of tubular form and composed of two separable members $H_1$ and $H_2$ having similar elongated body portions 3 and 4, respectively, and circular end portions 5 and 6. Portions 3 and 4 are spaced apart at adjacent edges to provide slots 7 and 8 at diametrically opposite positions for purposes to be hereinafter described, or in some cases only one of said slots may be provided.

Members $H_1$ and $H_2$ are detachably held together and are slightly telescopic at their ends in the form shown in Figs. 1 and 2 so that they may be readily separable for inserting or removing a tube T of dispensable material, the portion 6 of member H, having a beveled interior end surface 9 formed to correspond to the open end of tube T and an opening 10 is centrally formed in portion 6 to removably receive the end $T_1$, of tube T. Opening 10 may be threaded so as to receive the threaded portion $T_1$, or in lieu thereof a nut 11 may be screwed onto portion $T_1$, exteriorly of portion 6, so as to hold tube T stationary while the upper end thereof is being compressed and collapsed for forcing the material from tube T.

When the tube T is positioned in the holder the usual sealing cap (not shown) is removed from end $T_1$, and a closure $H_3$ may be screwed on portion 6 for closing the tube end against the atmosphere when the device is not in use.

The upper end of one of the separable members, as for instance $H_2$, has a circular portion 12 which fits inside of the upper end of member $H_1$ within the portion 5. The members $H_1$ and $H_2$ are held in attached relationship and at the same time, supported on a surface as at 13 by means of a clamp C which may have attaching feet 14, spacing portions 15, arcuate portions 16 and lugs 17, screws 18 are employed for supporting the bracket and clamp C on the wall or other surface 13 and an adjusting screw 19 connects the lugs 17 for drawing the opposite portions 16 of the clamp into frictional engagement with the outer surfaces of members $H_1$ and $H_2$ so as to hold said members in operative position and support the members in dispensing position.

A key K is provided with the holder for collapsing or curling the tube T and has a head $K_1$ and a stem $K_2$ with an elongated open ended slot $K_3$ formed therein and adapted to receive the flat end portion $T_2$ of tube T (see Fig. 1).

The head $K_1$ of said key is outwardly of the body of the holder and at the front or one side so that when it is manually turned, the tube T will be gradually wound on stem $K_2$ or the tube correspondingly compressed and collapsed for forcing the material from the open end $T_1$ of the tube.

As an optional form of device, the holder H may be integrally formed in lieu of the two members $H_1$ and $H_2$ and the upper end closed by a separable member $H_4$ replacing the portion 5, as shown in Fig. 5, the member $H_4$ being screwed onto the upper end of the body. In such case, tube T would be inserted and removed through the upper end of holder H when the cap $H_4$ is removed.

The device herein shown is adapted for manufacture of a plastic, metal or other material, is of sanitary, convenient and pleasing form and may readily be attached in any desired position for use.

What I claim is:

A device of the character described comprising: a holder for a tube of dispensable material formed of a pair of longitudinally separable mating members, each of which has an annular end portion and an arcuate body portion fixed thereto, said members being arranged so that an arcuate end of one member will telescopically engage an annular end of the other member, the annular portion of one member having an opening through which the dispensing end of a tube of material may be extended, adjacent edges of said body portions being circumferentially spaced to provide diametrically opposite slots for reception of and for guiding an operating member attachable to the closed end of the tube of material.

RUTH C. STICKNEY.